United States Patent [19]
Heinen et al.

[11] Patent Number: 5,994,931
[45] Date of Patent: Nov. 30, 1999

[54] METHOD AND CIRCUIT CONFIGURATION FOR CONTROLLING OPERATING STATES OF A SECOND DEVICE BY MEANS OF A FIRST DEVICE

[75] Inventors: Stefan Heinen, Krefeld; Udo Matter, Düsseldorf; Abdul-Karim Hadjizada, Ratingen, all of Germany

[73] Assignee: Siemens Aktiengesellschaft, Munich, Germany

[21] Appl. No.: 09/010,172

[22] Filed: Jan. 21, 1998

[30] Foreign Application Priority Data

Jan. 21, 1997 [DE] Germany .............................. 197 01 911

[51] Int. Cl.⁶ ........................................................ H03K 3/00
[52] U.S. Cl. ............................................. 327/141; 327/154
[58] Field of Search ..................................... 327/141, 154, 327/403, 293, 298, 299

[56] References Cited

U.S. PATENT DOCUMENTS

| | | | |
|---|---|---|---|
| 4,501,975 | 2/1985 | Josephs et al. ........................ | 327/186 |
| 5,227,790 | 7/1993 | Shin et al. .............................. | 341/100 |
| 5,278,581 | 1/1994 | Fukuyama et al. .................... | 346/108 |

FOREIGN PATENT DOCUMENTS 23 60 635  6/1978  Germany .

OTHER PUBLICATIONS

PMB 2220, Siemens, Semiconductor Group, Aug. 1995, pp. 1–23.

*Primary Examiner*—Tuan T. Lam
*Attorney, Agent, or Firm*—Herbert L. Lerner; Laurence A. Greenberg

[57] ABSTRACT

The ON and OFF states of a second device are controlled by a first device through a three-conductor bus. The bus carries data, clock, and enable signals and the second device is in the OFF state when all the signals of the three-conductor bus have an L level. The second device is in the ON state when at least one of the signals has an H level (higher potential than the L level). The enable signal is set to the H level during the data transmission. Otherwise, it carries an L level, while the data or clock signal has an H level. The system obviates an additional housing pin. The operating state information is transmitted relatively rapidly.

7 Claims, 1 Drawing Sheet

METHOD AND CIRCUIT CONFIGURATION FOR CONTROLLING OPERATING STATES OF A SECOND DEVICE BY MEANS OF A FIRST DEVICE

BACKGROUND OF THE INVENTION

1. Field of the Invention

The invention relates to a method and circuit configuration for controlling operating states of a second device by a first device, in which the devices are connected to each other via clock, data, and enable signal lines in order to switch the second device on and off. The invention also pertains to a corresponding circuit configuration.

In electronic devices in which the energy supply capacity is limited, for example in battery powered mobile radio devices, integrated circuits that are not used at times are switched off in order to save energy. This is employed particularly in time slot controlled operation, for example in accordance with the TDMA process (Time Division Multiple Access), in which transmit or receive operation only occurs in successive, discrete time slots. To this end, a microcontroller controls the operating states (i.e. switched on or off) of other integrated circuits contained in the device.

SUMMARY OF THE INVENTION

It is accordingly an object of the invention to provide a process and a circuit configuration for controlling operating states of a second device by a first device, which overcomes the above-mentioned disadvantages of the heretofore-known devices and methods of this general type and which require the lowest possible technical circuit expenditure and permit a rapid transmission of data for the purpose of controlling the operating state.

With the foregoing and other objects in view there is provided, in accordance with the invention, a method of controlling, with a first device, operating states of a second device, whereby the first and second devices are connected to each other via a first signal line carrying a clock signal, a second line carrying a digital data signal, and a third line carrying an enable signal, the method which comprises:

setting a first operating state in which the second device is switched off, by adjusting the clock signal, the data signal, and the enable signal to a first level with the first device;

setting a second operating state in which the second device is switched on, by adjusting at least one of the clock, data and enable signals to a second level having a more positive potential than the first level with the first device.

In accordance with an added mode of the invention, the enable signal indicates whether a transmission of data in the data signal and a clock pulse in the clock signal from the first device to the second device is valid.

In accordance with an additional feature of the invention, during a period in which the enable signal indicates the transmission of data and clock pulse as being valid, the enable signal is set to the second level and, during a remaining period of time, the enable signal is set to the first level and the data and/or clock signals are set to the second level.

In accordance with another feature of the invention, a control signal is generated in the second device for switching on the second device by producing an OR link among the signals of the first, second and third lines.

With the above and other objects in view there is provided, in accordance with the invention, a circuit configuration which comprises:

a first device and a second device controlled, with regard to its operating states (ON, OFF), by the first device; the first device being connected to the second device via a first line for transmitting a clock signal, a second line for transmitting a digital data signal, and a third line for transmitting an enable signal, by means of which a transmission of data and clock pulse is indicated as valid;

the second device including a switching device for setting a first operating state, in which the second device is switched off, when each of the first, second, and third lines is set to a first signal level, and for setting a second operating state, in which the second device is switched on, when at least one of the first, second, and third lines is set to a second signal level which has a more positive potential than the first signal level.

In accordance with again an added feature of the invention, the switching device includes an OR switching element having three inputs respectively connected to the first, second, and third lines and an output issuing a control signal for selectively switching functional units of the second device on and off.

In accordance with again another feature of the invention, the first device generates the signals carried on the first, second and third lines such that, during a period of time in which the enable signal indicates that a transmission of data and clock pulse is valid, the enable signal is set to the second level, and that during a remaining time, the enable signal is set to the first level and at least one of the data and clock signals is set to the second level.

In accordance with a concomitant feature of the invention, the second device is a bipolar circuit device including differential amplifier circuit stages with operating points that are adjustable with reference voltages and including a device for generating the reference voltages in the second operating state, and switching off the reference voltages during the first operating state.

In other words, the objects are attained in that only the signal lines for clock, data, and enable are required, which are necessary anyway for the rest of the data transmission. In order to change over into the ON state or to switch back into the OFF state, only the monitoring of the signal level at one time is respectively required so that the transmission of the control information only takes a small amount of time. The operating states, accordingly, are switched very rapidly.

The advantages over the prior art are apparent. Comparable prior art devices require an additional line here, which on the one hand necessitates an additional input pin on the housing of the integrated circuit and on the other hand additional low-pass filter expenditure in high frequency applications in mobile radio devices.

Technically, the circuit is realized in the integrated circuit of the controlled device by providing the OR switching element and connecting it to the three-conductor bus. Where the circuit is embodied in bipolar circuit technology, a reference voltage generator that supplies the integrated circuit is advantageously driven by means of the OR switching element.

Other features which are considered as characteristic for the invention are set forth in the appended claims.

Although the invention is illustrated and described herein as embodied in a method and circuit configuration for controlling, by means of a first device, the operating states of a second device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
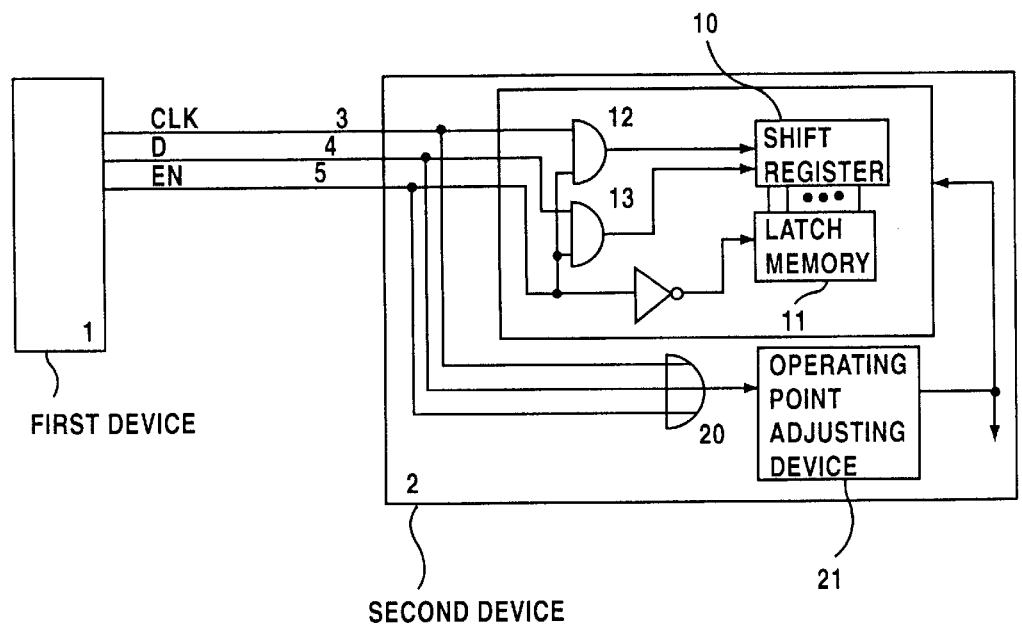
FIG. 1 is a schematic circuit diagram illustrating the invention.

Referring now to the figures of the drawing in detail and first, particularly, to FIG. 1 thereof, there is seen a first device 1 (e.g. a microcontroller 1), and a second device 2. The second device 2 is a high frequency IC embodied, by way of example, with bipolar circuit technology, for instance a bipolar PLL. The device 2 is connected to three lines 3, 4, 5 via a bus. The three-conductor bus allows the microcontroller 1 to control the data transmission to the circuit 2 as well as to other circuits. The microcontroller 1 also is enabled to control the operating states of the circuit 2. The circuit 2 can either assume an ON (switched on) operating state or an OFF (switched off) operating state (stand by). The three-conductor bus includes a first line 3 for transmitting a clock signal CLK, a second line 4 for transmitting a data signal D, and a third line 5 for transmitting an enable signal EN. The latter signal is used to indicate to the device 2 that the clock and data signals present on the lines 3, 4 are valid. The clock and data signals of the lines 3, 4 can be received in the device 2 during this time. The device 2 contains a shift register 10 for receiving data, into which the data of the data signal D of the line 4 are serially read. A latch memory 11 takes in the data of the shift register 10 in bit parallel form. The signals CLK and D are supplied to the shift register 10, wherein they are disconnected via AND gates 12, 13 by means of the signal EN. If the signal EN is deactivated, the data transfer is terminated and the content of the shift register 10 is taken into the latch 11.

An OR switching element 20 is connected on the input end to the lines 3, 4, 5. An output of the OR gate 20 is carried to and controls an operating point adjusting device 21 which ensures that the receiving devices 10–13 and other functional units of the integrated circuit 2 are supplied with reference voltages and are switched on as a result. The device 21, as driven by the OR gate 20, therefore, acts as a switching device for the integrated circuit 2. The circuits of the integrated circuit 2 are made with bipolar circuit technology. They contain, for example, bipolar differential amplifier circuit stages whose operating points can be adjusted by means of reference voltages. It is a well known fact that a bipolar differential amplifier contains two emitter-coupled transistors which are connected to reference potential through a current source. The reference voltage controls the current source. Furthermore, reference voltages can be present which trigger one of the emitter-coupled transistors of the differential amplifier. In order to switch on the integrated circuit 2, the device 21 produces the corresponding reference voltages. The integrated circuit 2 is switched off by switching off the reference voltages.

Figure 2:
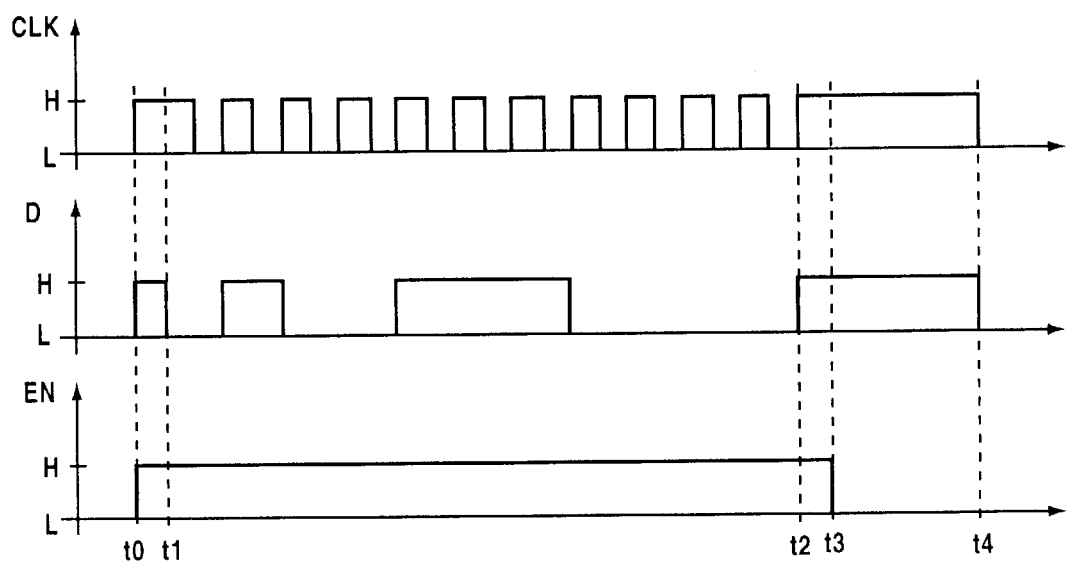
FIG. 2 is a signal diagram referring to the three-conductor bus.

In conjunction with the signal diagram for the signals CLK, D, EN represented in FIG. 2, an example for a data transmission between the devices 1, 2 is explained, including changeovers between the operating states of the device 2. Before the time t0, all three signal lines carry an L level. An L level exists at a low potential. This compares to an H level, which exists at a higher, more positive potential. The OR gate 20 is closed so that the device 21 does not produce any reference voltages and as a result, the bipolar integrated circuit 2 is switched off. At the time t0, the three signals CLK, D, EN change over to an H level. The OR gate 20 is activated so that the device 21 produces the reference voltages and the integrated circuit 2 is switched on. The length of time until time t1 is necessary in order to increase the reference voltages in the device 2. Then a data transmission occurs in which the clock signal CLK transmits the data pulse, the data signal D transmits digital data in the form of L and H pulses, and the enable signal EN maintains an H level. At time t3, the data transmission is terminated. The enable signal EN changes over to an L level. Switching stages inside the microcontroller 1 assure that at time t2 immediately before this at least one of the signals CLK or D (both signals in the example shown) has an H level. The OR gate 20 is then active even after termination of the data transmission and the integrated circuit 2 remains switched on. The processing of the transmitted data occurs between the times t3 and t4. At time t4, the signals CLK and D are also switched to an L level so that the OR gate closes and the integrated circuit 2 switches back into the switched off (stand by) operating state.

The signal processing represented between the times t0 and t4 takes place, for example, during an active time slot inside a mobile radio system which operates in accordance with the TDMA process. The controlled integrated circuit 2 is only switched on during a time slot of this kind. Only during this time does the circuit consume power loss. The switching on and off occurs relatively rapidly, by evaluating the switching state of the OR gate 20. The association of the signal levels with the operating states is as follows:

OFF: CLK=L, D=L, EN=L;

ON: at least one of CLK, D, EN=H;

data transmission: EN=H (CLK, D arbitrary)

end of transmission: EN=L, CLK and/or D=H;

and is selected such that during the OFF state, all functional units of the device 2 are switched off and without current. In order to detect the need to be switched on when in the switched off state, it is not necessary that the circuits of the integrated circuit 2 have previously assumed a particular switching state. This is particularly advantageous in bipolar circuits since their switching elements, for example differential amplifier circuit stages, always carry a current when turned on, independent of the switching state (H or L).

We claim:

1. A method of controlling, with a first device, operating states of a second device, whereby the first and second devices are connected to each other via a first signal line carrying a clock signal, a second line carrying a digital data signal, and a third line carrying an enable signal, the method which comprises:

setting a first operating state in which the second device is switched off, by adjusting the clock signal, the data signal, and the enable signal to a first level with the first device;

setting a second operating state in which the second device is switched on, by adjusting at least one of the clock, data and enable signals to a second level having a more positive potential than the first level with the first device; and indicating with the enable signal whether a transmission of data in the data signal and a clock pulse in the clock signal from the first device to the second device is valid.

2. The method according to claim 1, which further comprises, during a period of time in which the enable signal indicates the transmission of the data and the clock pulse as being valid, setting the enable signal to the second level and, during a subsequent period of time, setting the enable signal to the first level and setting at least one of the data or clock signals to the second level.

3. The method according to claim 1, which further comprises generating a control signal in the second device for switching on the second device by producing an OR link among the signals of the first, second and third lines.

4. A circuit configuration, comprising:

a first device;

a second device;

said first device controlling respective operating states of said second device;

said first device being connected to said second device via a first line for transmitting a clock signal, a second line for transmitting a digital data signal, and a third line for transmitting an enable signal to indicate that a transmission of the clock signal and a transmission of the digital data signal are valid;

said second device including a switching device for setting a first operating state, in which said second device is switched off, when each of said first, second, and third lines is set to a first signal level, and for setting a second operating state, in which said second device is switched on, when at least one of said first, second, and third lines is set to a second signal level which has a more positive potential than the first signal level; and said switching device including an OR switching element having three inputs respectively connected to said first, second, and third lines and an output issuing a control signal for selectively switching functional units of said second device on and off.

5. The circuit configuration according to claim 4, wherein said second device is a bipolar circuit device further including differential amplifier circuit stages with operating points that are adjustable with reference voltages and including a device for generating the reference voltages in the second operating state, and switching off the reference voltages during the first operating state.

6. A circuit configuration, comprising:

a first device;

a second device;

said first device controlling respective operating states of said second device;

said first device being connected to said second device via a first line for transmitting a clock signal, a second line for transmitting a digital data signal, and a third line for transmitting an enable signal to indicate that a transmission of the clock signal and a transmission of the digital data signal are valid;

said second device including a switching device for setting a first operating state, in which said second device is switched off, when each of said first, second, and third lines is set to a first signal level, and for setting a second operating state, in which said second device is switched on, when at least one of said first, second, and third lines is set to a second signal level which has a more positive potential than the first signal level; and said first device generating the signals carried on said first, second and third lines such that, during a period of time in which the enable signal indicates that a transmission of the clock signal and a transmission of the digital data signal are valid, the enable signal is set to the second level, and that during a remaining time, the enable signal is set to the first level and at least one of the data and clock signals is set to the second level.

7. The circuit configuration according to claim 6, wherein said second device is a bipolar circuit device further including differential amplifier circuit stages with operating points that are adjustable with reference voltages and including a device for generating the reference voltages in the second operating state, and switching off the reference voltages during the first operating state.

* * * * *